United States Patent
Hua

(10) Patent No.: US 6,456,906 B1
(45) Date of Patent: Sep. 24, 2002

(54) SATELLITE POSITIONING-BASED GUIDANCE SYSTEM THAT UTILIZES SIMULATED INERTIAL NAVIGATION SYSTEM

(75) Inventor: Cuong Tu Hua, Fremont, CA (US)

(73) Assignee: Trimble Navigation, LTD, Sunnyvale, CA (US)

(*) Notice: Subject to any disclaimer, the term of this patent is extended or adjusted under 35 U.S.C. 154(b) by 0 days.

(21) Appl. No.: 09/443,237

(22) Filed: Nov. 18, 1999

(51) Int. Cl.[7] .............................. G05D 1/00; G05D 3/00
(52) U.S. Cl. ................... 701/13; 701/3; 701/2; 342/62; 244/3.1; 102/501
(58) Field of Search .............................. 701/13, 3, 200, 701/213, 214, 2; 244/3.11, 3.15, 3.16, 3.21, 3.22, 3.1; 342/62; 102/398, 399, 501; 73/178 R

(56) References Cited

U.S. PATENT DOCUMENTS

| | | | | |
|---|---|---|---|---|
| 3,795,911 A | * | 3/1974 | Hammack | 343/9 |
| 5,862,496 A | * | 1/1999 | Biven | 701/3 |
| 5,886,257 A | * | 3/1999 | Gustafson et al. | 73/178 R |

* cited by examiner

Primary Examiner—Yonel Beaulieu
(74) Attorney, Agent, or Firm—Boris G. Tankhilevich

(57) ABSTRACT

A satellite positioning-based guidance system and method that utilize a simulated inertial navigation system are disclosed. The trajectory of the body of a non-thrusted flight vehicle is used instead of a conventional inertial navigation system. The attitude of the flight vehicle is determined using a satellite receiver, and the Extended Kalman filter is used to implement the navigation function.

13 Claims, 6 Drawing Sheets

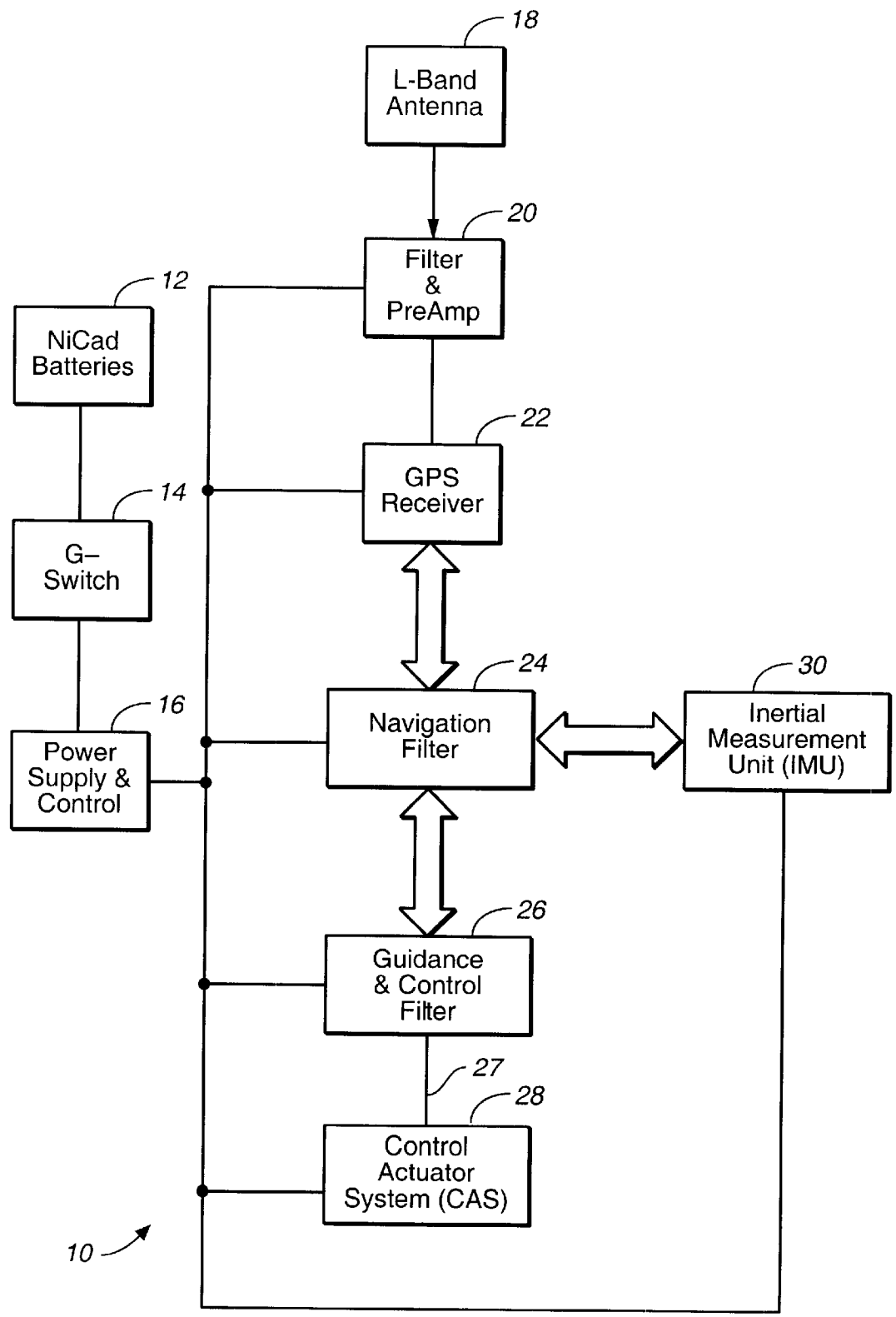
FIG._1
*(PRIOR ART)*

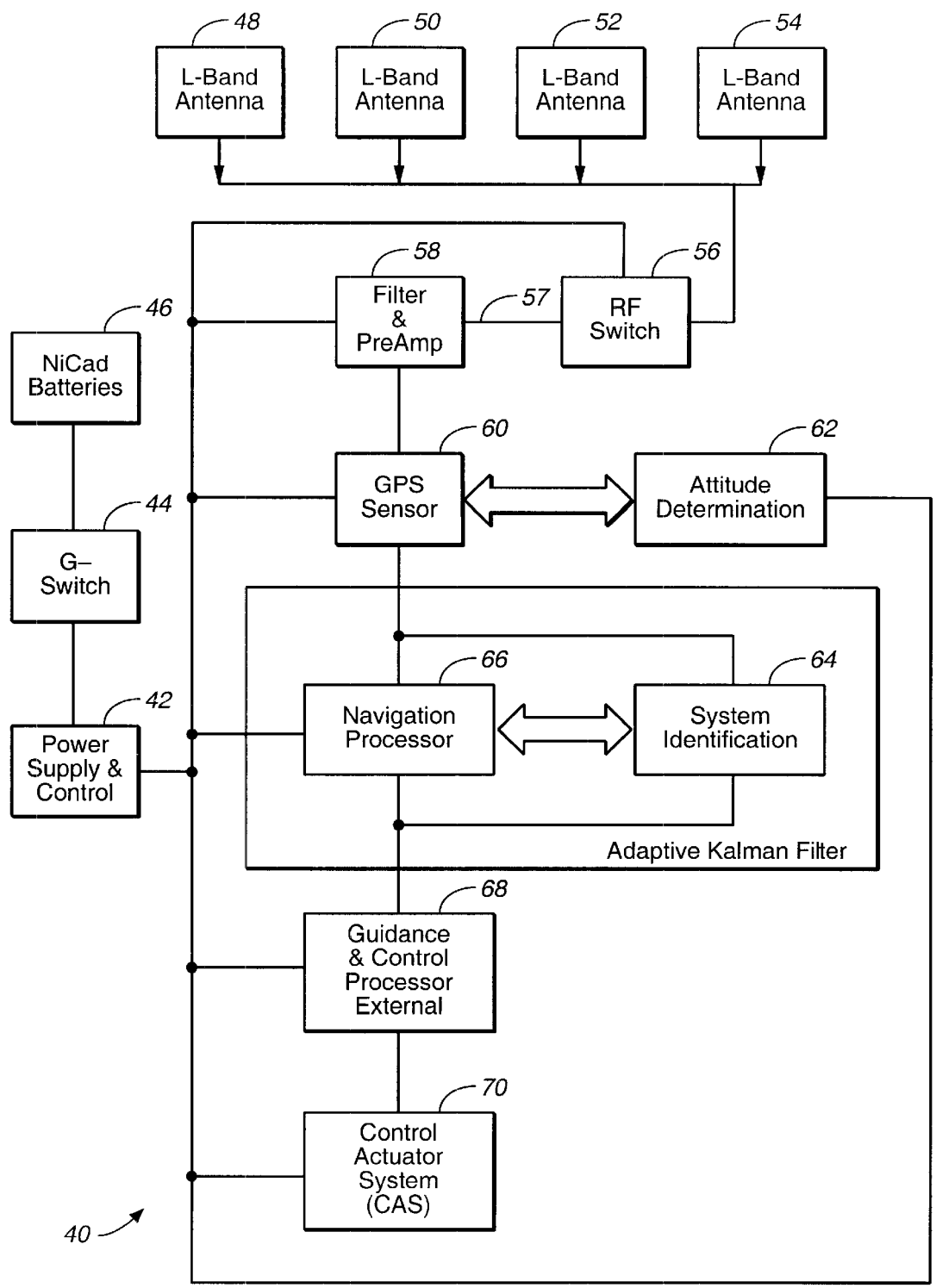
FIG._2

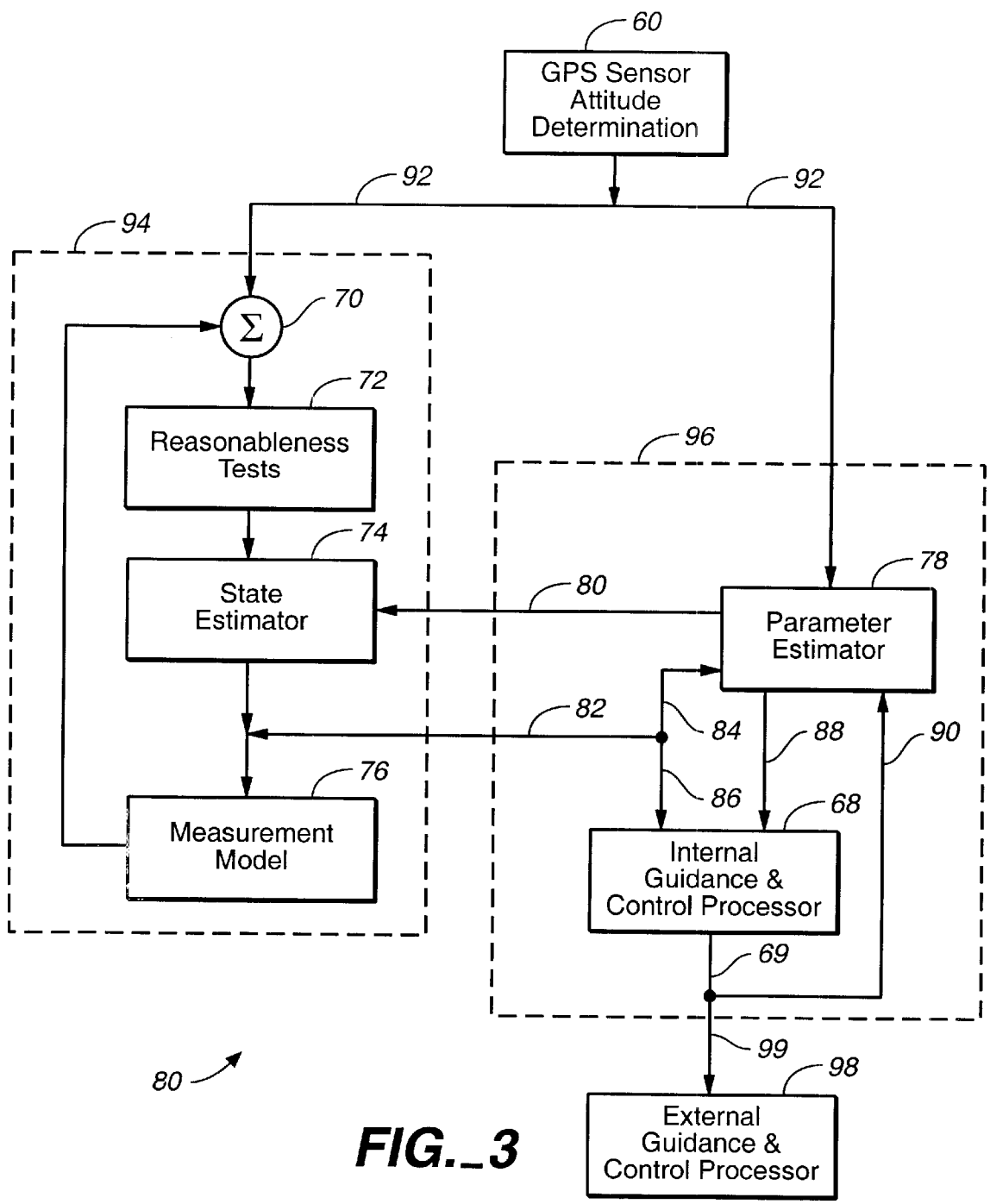
FIG._3

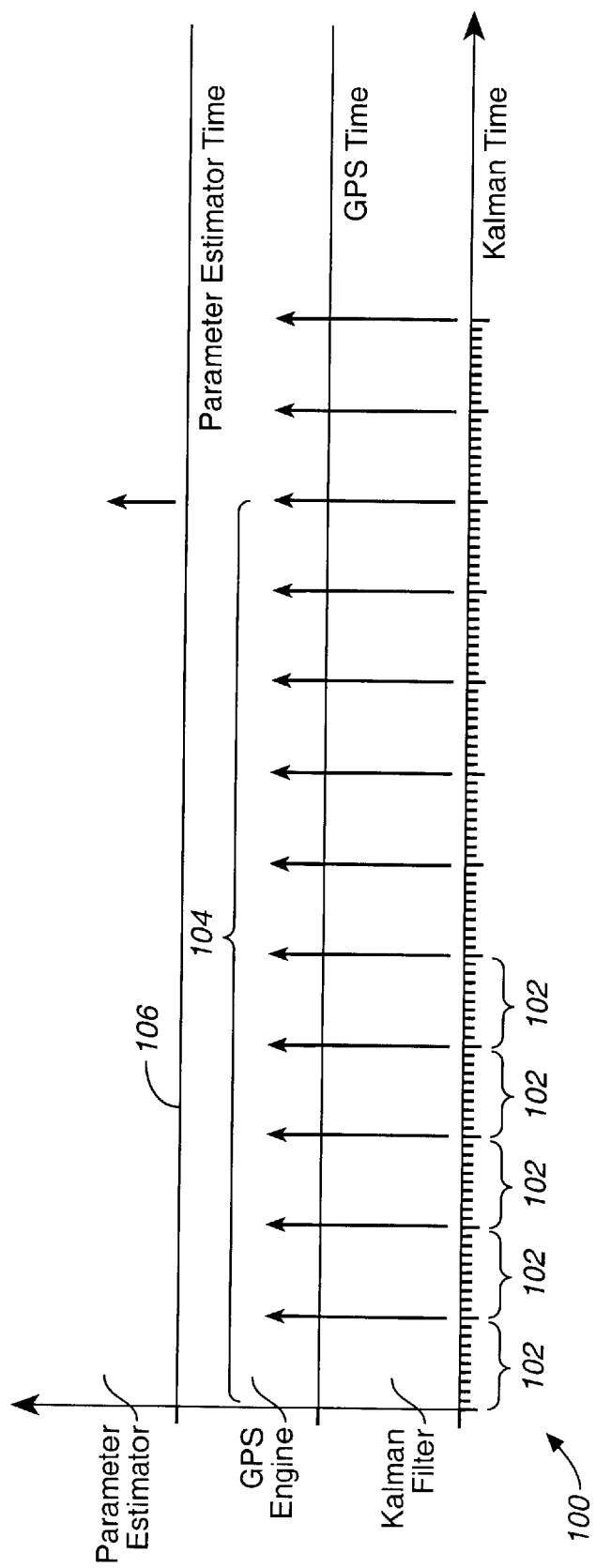
FIG._4

Projectile Velocity, Deficit Velocity, and Velocity to be Gained
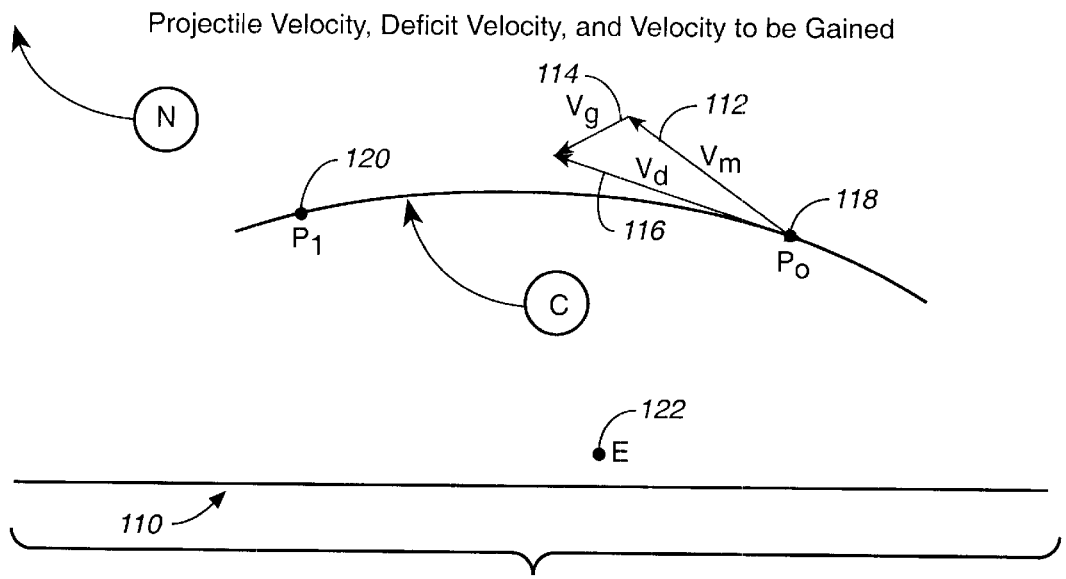
FIG._5
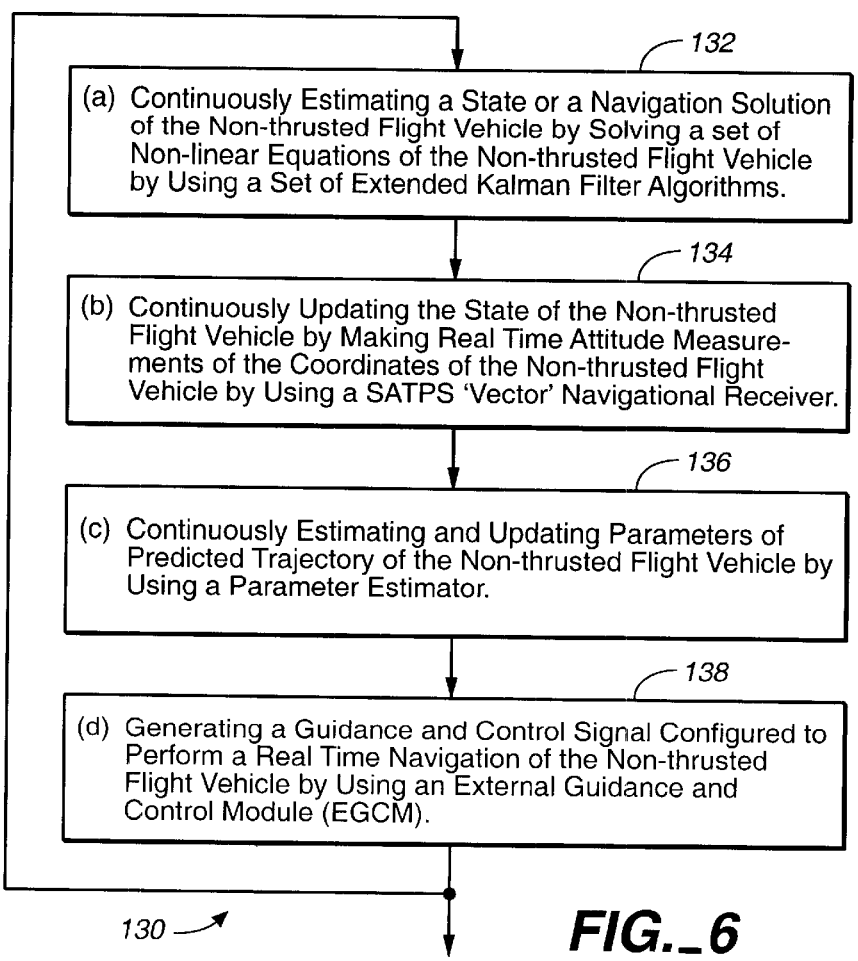
FIG._6

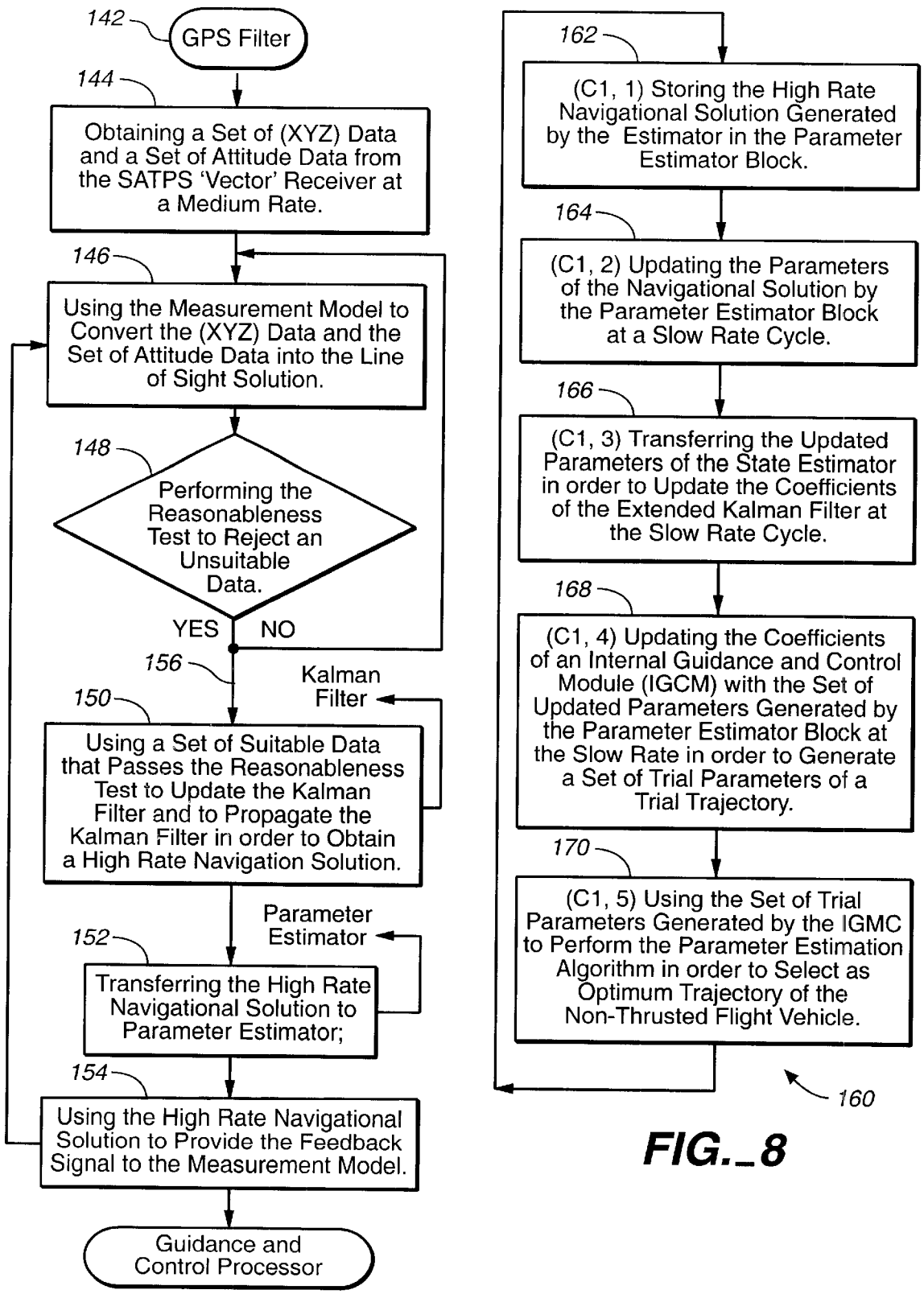

SATELLITE POSITIONING-BASED GUIDANCE SYSTEM THAT UTILIZES SIMULATED INERTIAL NAVIGATION SYSTEM

FIELD OF THE INVENTION

The current invention is in the field of optimization of the satellite-based navigation, guidance, and control system.

DESCRIPTION OF THE BACKGROUND ART

A prior art conventional Navigation, Guidance, and Control (NG&C) system of missiles and space vehicles includes a GPS-based guidance system combined with an Inertial Navigation System (INS). The INS includes an Inertial Measurement Unit (IMU) designed to measure motions of a host vehicle. Specifically, the IMU block measures the swing of the proof mass of its accelerometers to infer translational accelerations of the host vehicle. Similarly, the IMU block measures the movement of the axes of its spinning gyroscopes to calculate rotational rates. Thus, the accuracy of an IMU-derived data is a function of how well motions of its inertial sensors are known and characterized.

In some applications, however (for instance, for a non-thrusted vehicle such as a projectile), the Gs-accelerations are so high (G≈20,000), that the G-unhardened inertial sensors of the IMU system (spinning gyroscopes) fail. The G-hardening is a very expensive process.

On the other hand, a non-thrusted vehicle, such as a projectile, has its ballistic trajectory well-defined.

There is therefore a need in the art for to replace an IMU sensor in a Navigation, Guidance, and Control (NG&C) system by a body of a non-thrusted vehicle itself.

SUMMARY OF THE INVENTION

To address the shortcomings of the available art, the present invention provides, for a satellite-based guidance system that uses the body of the non-thrusted vehicle itself as its inertial sensor.

One aspect of the present invention is directed to a method of a satellite positioning system (SATPS)-based guidance of a non-thrusted flight vehicle.

In one embodiment, the method comprises the following steps: (a) estimating a state or a navigation solution of the non-thrusted flight vehicle by solving a set of non-linear equations of the non-thrusted flight vehicle by using a set of Extended Kalman Filter algorithms; (b) updating the state of the non-thrusted flight vehicle by making real time attitude measurements of the coordinates of the non-thrusted flight vehicle by using a SATPS 'vector' navigational receiver; (c) estimating and updating parameters of predicted trajectory of the non-thrusted flight vehicle by using a Parameter Estimator; and (d) generating a guidance and control signal configured to perform a real time navigation of the non-thrusted flight vehicle by using an External Guidance and Control Module (EGCM).

In one embodiment, the step (a) of estimating the state of the non-thrusted flight vehicle further includes the step (a1) of performing linearization of the set of non-linear equations of motion of the non-thrusted flight vehicle around a nominal trajectory and converting the set of non-linear equations of motion into a set of linearized equations of motion that is solvable by a Standard Kalman Filter method.

In one embodiment, the step (c) of estimating and updating parameters of predicted trajectory of the non-thrusted flight vehicle by using the Parameter Estimator further includes the step of (c1) updating in real time an estimated set of external parameters and an estimated set of internal parameters of the non-thrusted flight vehicle in order to provide the in-flight corrections to initial conditions of the initially predicted trajectory of the non-thrusted flight vehicle, so that the corrected ballistic trajectory of the non-thrusted flight vehicle hits an aimpoint.

In one embodiment, the step (d) of generating the guidance and control signal further includes the steps of: (d1) predicting an impact point by using the predictive proportional navigation (PPN) guidance algorithm; and (d2) generating a control command to the canards and/or fins of the non-thrusted flight vehicle by comparing the predicted impact point with the aimpoint.

In another embodiment, the step (d) of generating the guidance and control signal further includes the step (d3) of calculating the delta velocity required to fly the non-thrusted flight vehicle to the aimpoint by applying correlated velocity algorithm to a correlated velocity, wherein the correlated velocity is generated by aerodynamic forces on control surfaces of the non-thrusted flight vehicle.

Another aspect of the present invention is directed to an apparatus for a satellite positioning system (SATPS)-based guidance of a non-thrusted flight vehicle.

In one embodiment, the apparatus of the present invention comprises:

(a) a set of Extended Kalman Filter algorithms configured to estimate a state or a navigation solution of the non-thrusted flight vehicle by solving a set of non-linear equations of motion of the non-thrusted flight vehicle;

(b) a SATPS 'vector' navigational receiver configured to update the state of the non-thrusted flight vehicle by making real time attitude measurements of the coordinates of the non-thrusted flight vehicle;(c) a Parameter Estimator configured to estimate and update parameters of predicted trajectory of the non-thrusted flight vehicle; and (d) an External Guidance and Control Module (EGCM) configured to generate a guidance and control signal to perform a real time navigation of the non-thrusted flight vehicle.

In one embodiment, the satellite positioning system (SATPS)-based guidance system of a non-thrusted flight vehicle comprises a GPS-based guidance system, and the SATPS 'vector' navigational receiver comprises a GPS 'vector' navigational receiver.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a conventional GPS-based Guidance System.

FIG. 2 shows a GPS-based Navigation, Guidance, and Control (NG&C) system (40) of the present invention.

FIG. 3 illustrates the Navigation Processor of FIG. 2 implemented as an Adaptive Kalman filtering algorithm.

FIG. 4 depicts the comparison between three relevant clock rates of the present invention: the 'slow Parameter Estimator clock rate', the 'medium GPS clock rate', and the 'high Kalman clock rate'.

FIG. 5 illustrates the projectile velocity, deficit velocity, and velocity to be gained.

FIG. 6 shows the flow chart of the main steps that are performed by the NG&C system of the present invention.

FIG. 7 depicts a flow chart of the steps performed by the Extended Kalman filter algorithms of the present invention.

FIG. 8 illustrates the flow chart of the method of updating in real time the estimated set of parameters of the trajectory of the non-thrusted flight vehicle of the present invention.

DETAILED DESCRIPTION OF THE PREFERRED AND ALTERNATIVE EMBODIMENTS

A prior art Navigation, Guidance, and Control (NG&C) system for a flight vehicle is based on, and constructed around, an Inertial Navigation System (INS). The GPS is used as a support device to update the Kalman filter equations. (Please, see discussion below).

The present invention, on the other hand, is directed to certain applications, especially to a Navigation, Guidance, and Control (NG&C) system for a non-thrusted flight vehicle such as a projectile. Indeed, the ballistic trajectory of a non-thrusted flight vehicle is very well defined, and the body motion of the non-thrusted flight vehicle itself is used as an inertial sensor that is implemented in software, for instance, by an Adaptive Kalman filter. The GPS is used as the only sensor hardware. The Adaptive Kalman filter regularly uses the GPS sensor output signals during the flight to provide corrections to initial conditions to a ballistic trajectory, to update the non-thrusted flight vehicle drag and other aerodynamic coefficients. If GPS is available during a maneuver the Kalman filter will be able to calibrate other parameters of control surfaces of the projectile. If the GPS is lost due to jamming, etc., the Adaptive Kalman filter can be used as a simulated INS. Thus the system of the present invention has no INS hardware. Indeed, the cost of a G-hardened INS (about 25,000 Gs in a 155-mm artillery shell) is substantial. On the other hand, it is much easier to G-harden a GPS receiver card. (Please, see the complete discussion below).

FIG. 1 depicts a prior art conventional GPS-based Guidance System (10) that utilizes the Inertial Measurement Unit (IMU) block (30) to measure the movement of the axes of its spinning gyroscopes to calculate rotational rates.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite transmits two spread spectrum, L-band carrier signals: an L1 signal having a frequency f1=1575.42 MHZ (nineteen centimeter carrier wavelength) and an L2 signal having a frequency f2=1227.6 MHZ (twenty-four centimeter carrier wavelength). These two frequencies are integral multiplies f1=1,540 f0 and f2=1,200 f0 of a base frequency f0=1.023 MHZ. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of f0=10.23 MHZ. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHZ. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+

7k/16) GHz, where k (=1,2, . . . 24) is the channel or satellite number. These frequencies lie in two bands at 1.597–1.617 GHz (L1) and 1,240–1,260 GHz (L2). The L1 signal is modulated by a C/A-code (chip rate=0.511 MHZ) and by a P-code (chip rate=5.11 MHZ). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The following discussion is focused on a GPS-based Navigation, Guidance and Control System, but is fully applicable to a SATPS-based Navigation, Guidance and Control System.

Referring back to FIG. 1, output signals from the IMU are fed to the Navigation Filter (24) which is usually implemented as a simple 9-state Kalman filter.

The Kalman filter is well described by Arthur Gelb in the book "Applied Optimal Estimation", published in 1974 by the M. I. T. Press, Cambridge, Mass., pp. 103–127 and 146.

The development of data processing methods for dealing with random variables was first suggested by Gauss, who invented the technique of deterministic least-squares. Wiener, using random process theory, developed a procedure for the frequency domain design of statistically optimal filters. Kalman used the optimal recursive filter techniques based on state-space, time domain formulations. This approach is known as a Kalman filtering, and is very well suited for digital computer implementation. The Kalman filtering is a recursive solution to Gauss original least-squares problem. A recursive solution enables one to do sequential, rather than batch, processing of the measurement data.

An optimal estimator is a computational algorithm. This algorithm utilizes measurements to obtain a minimum error estimate of the state of a system. The optimal estimator algorithm does that by utilizing knowledge of system and measurement dynamics, assumed statistics of system noises and measurement errors, and initial condition information.

When the time at which an estimate is taken coincides with the last measurement point, we deal with the filtering problem.

Least squares (LS) parameter estimation can be considered as a special case of the Kalman filter. In LS model of the Kalman filter, the measurement noise is considered to be small compared with the system noise. The Kalman filter state vector updates then become the LS parameter estimation. The LS solution satisfies the condition that the weighted sum of the squares of the resultant a posteriori residuals is minimum.

Referring back to FIG. 1, the Navigation Filter (24) propagates the initial position and attitude of the host vehicle to the current time via dead reckoning at the speed of the 'high clock rate'. The speed of the 'high rate clock' is determined by the speed of the processor that propagates the Kalman filter equations.

In one embodiment, the high rate is approximately 100 Hz.

At predetermined intervals, the GPS receiver (22) provides position and velocity fixes to the system at the 'medium rate clock'. The speed of the 'medium rate clock' depends on how high the particular GPS receiver can obtain the position fixes of the host vehicle.

In one embodiment, the medium rate is approximately 10 Hz.

In the prior art architecture, the Navigation Filter (24 of FIG. 1) uses the IMU measurements to update its solution. The navigation filter is well described in the text book "Introduction to Random Signal and Applied Kalman Filtering", by R. Grover Brown and Patrick Y. C. Hwang, published by John Wiley & Sons, Inc., in New York, Second Edition, in 1992.

The Guidance and Control Filter (26) is fed from the output of the Navigation Filter (24).

The Guidance and Control Filter (26) utilizes a guidance algorithm commonly known in the art as the Proportional Navigation (PN) guidance law to develop a control signal (27). This algorithm is discussed in "Modern Navigation, Guidance, and Control Processing", Chapter 6, by Ching-Fang Line, Prentice Hall Series in Advanced Navigation, Guidance and Control, and their Applications; 1991, New Jersey.

The control signal (27) is fed to the Control Actuator System (CAS) (28).

FIG. 2 depicts a GPS-based Navigation, Guidance, and Control (NG&C) system (40) of the present invention.

Comparing the NG&C system of the present invention (40 of FIG. 2) with the prior art NG&C system (10 of FIG. 1), one can see that the main difference between the two designs is the elimination of the IMU block (30 of FIG. 2) in the system (40 of FIG. 2).

In the prior art system (10 of FIG. 1), the IMU block (30) takes advantage of the knowledge of the movements of its inertial sensors. The swing of its proof mass is proportional to the translational accelerations and the deflections of the axes of its spinning wheels can be inferred to rotational rates.

In the present invention, as was stated above, the host vehicle body, itself, serves as an inertial sensor. The function of the IMU is simulated, in software in the "System Identification" block (64) and in the "Navigation Processor" block (66) which is the brain of the entire system.

The system (40 of FIG. 2) combines very tightly-coupled navigation, guidance, and control functions. Furthermore, the system (40 of FIG. 2) employs a GPS sensor (60) with attitude determination capability.

In the U.S. Pat. No. 5,268,695 issued to Dentinger et al., a system for time multiplexing a carrier signal received by two or more GPS antennas through a single hardware path was disclosed. This patent is incorporated in the current patent application by reference in its entirety. The system of '695 patent is referred to herein as a 'vector' GPS receiver.

The 'vector' GPS receiver utilizes four GPS antennas (48–52) of FIG. 2) one Master antenna and three Slave antennas. The code and carrier measurements are performed by using the Master antenna in order to compute the position, velocity and time coordinates (PVT) of the system. The carrier phase measurements are performed by using three Slave antennas in order to compute the attitude (ATT) of the system. All four antennas are time multiplexed in the block RF Switch (56) in order for a received carrier signal to enter a single hardware path (57) to provide both translational and rotational feedbacks to the package.

FIG. 6 illustrates the flow chart (130) of the main steps that are performed by the NG&C system (40 of FIG. 2) of the present invention In one embodiment of the present invention, the Adaptive Kalman filtering algorithm (80 of FIG. 3) comprises a Navigation Processor (66 of FIG. 2). In the first step (132 of FIG. 6), the Navigation Processor (66 of FIG. 2) estimates a state or a navigation solution of the non-thrusted flight vehicle by solving a set of non-linear equations of the non-thrusted flight vehicle by using a set of Extended Kalman Filter algorithms.

In one embodiment, the step of solving the set of non-linear equations includes its linearization around a nominal trajectory and converting the set of non-linear equations of motion into a set of linearized equations of motion that is solvable by a Standard Kalman Filter method.

The general adaptive control scheme includes four major components arranged in two loops The inner or control loop includes a state estimator (Kalman filter) and a state feedback controller. The outer or gain loop includes an on-line parameter estimator and a second block which recalculates the filter and controller gains using the latest estimates of the vehicle parameters. In one embodiment of the present invention, the Adaptive Kalman filtering algorithm (80 of FIG. 3) includes two loops: a State Estimator (74) in the inner loop (94) and a Parameter Estimator (78) in the outer loop (96). In the Kalman Filter Equation the total error state represents errors in the navigation process, the parameters in the body dynamics, and the GPS update process. This is modeled as a set of state vectors for each process.

If the GPS signal is lost due to jamming, etc., the Adaptive Kalman filter to (80 of FIG. 3) can be used itself as a simulated INS.

The corresponding dynamic equations are provided as a linearized process. The dynamic equation models the error dynamics through the use of a state dynamics matrix, a noise dynamics, and noise terms.

In one embodiment of the Adaptive Kalman Filter (80 of FIG. 3), the following 9 states represent the standard navigation error states in inertial frame: position errors, velocity errors, and attitude errors.

The complete Kalman filter formulation is well known in the art and is not reproduced herein.

Body dynamic errors consist of force states, (like, CN—Normal force Coefficient, b—Drag coefficient, etc.), moment states, (like, $C_M$—Moment coefficient, etc), and air density states (like, air density, air viscosity, etc).

In one embodiment of the invention, the Parameter Estimator (78 of FIG. 3) estimates the slow varying external and internal parameters including the body dynamics errors at the 'slow clock rate'.

In one embodiment of the intention, as shown in FIG. 4, the 'slow Parameter Estimator clock rate' (102) is 10 times slower than the 'medium GPS clock rate' (104) which is 10 times slower than the 'high Kalman clock rate' (106).

In one embodiment, the slow rate is 1 Hz, the medium rate is 10 Hz, and the high rate is 100 Hz.

The error model for body dynamics can be obtained from wind tunnel tests.

The error model for a typical GPS receiver is represented by 6 states: {receiver pseudo range error, receiver delta range error, receiver's clock g-sensitivity, and the 3-vector of the GPS antenna offset errors in body frame}. The errors for each GPS satellite are represented by the following 6 states (24 states for 4 satellites): {satellite pseudo range error, satellite delta range error, tropospheric model error, and ephemeris errors}.

The complete equations for GPS receiver states and satellite states are described in the text book "Introduction to Random Signal and Applied Kalman Filtering", by R. Grover Brown and Patrick Y. C. Hwang, published by John Wiley & Sons, Inc., in New York, Second Edition, in 1992.

Referring back to the flow chart (134 of FIG. 6), the state of the non-thrusted flight vehicle is being updated by the Navigation Processor (66 of FIG. 2 and 94 of FIG. 3) that incorporates the attitude measurements of the coordinates of the non-thrusted flight vehicle performed by the SATPS 'vector' navigational receiver (60 of FIG. 3) at a medium rate.

Thus, the Navigation Processor (66 of FIG. 2 and 94 of FIG. 3) performs a number of functions as depicted in the flow chart (140) of FIG. 7.

After obtaining a set of (XYZ) data and a set of attitude data from the SATPS 'vector' receiver at a medium rate (step 144 of FIG. 7), the Navigation Processor (94 of FIG. 3) uses the Measurement Model (block 76 of FIG. 3) to convert the (XYZ) data and the set of attitude data into the line of sight solution (step 146 of FIG. 7).

After performing the Reasonableness test (block 72 of FIG. 3) in order to reject an unsuitable data (step 148 of FIG. 7), the Navigation Processor (94 of FIG. 3) separates the suitable data from the unsuitable data (logical gate 156 of FIG. 7).

The set of suitable data that passes the Reasonableness test is used by the State Estimator (block 74 of FIG. 3) to update and propagate the Kalman filter in order to obtain a high rate navigation solution (step 150 of FIG. 7).

The navigational solution is transferred to the Parameter Estimator (block 78 of FIG. 3) at a high rate in the next step (152 of FIG. 7).

The Parameter Estimator (78 of FIG. 3) (see discussion below) provides a feedback signal (82) to the Measurement Model (step 154 of FIG. 7) at a slow rate. Thus, the Measurement Model (76 of FIG. 80) is due to update if and when the external and/or internal parameters of the flight of the non-thrusted flight vehicle change.

Referring back to FIG. 6, after the state of the non-thrusted flight vehicle is being update at a medium rate by using the adjustments generated by the GPS 'vector' receiver, the parameters of predicted trajectory of the non-thrusted flight vehicle are being estimated and updated at a slow rate (step 136 of FIG. 6) by using a Parameter Estimator (78 of FIG. 3).

In one embodiment, the Parameter Estimator updates at slow clock rate an estimated set of external parameters and an estimated set of internal parameters of the non-thrusted flight vehicle in order to provide the in-flight corrections to initial conditions of the initially predicted trajectory of the non-thrusted flight vehicle, so that the corrected ballistic trajectory of the non-thrusted flight vehicle hits a target (an aimpoint).

In one embodiment, the set of external and the set of internal parameters of the non-thrusted flight vehicle are estimated by using a weighting least square fit operation.

FIG. 5 depicts the projectile velocity, deficit velocity, and velocity to be gained.

Projected Deficit guidance algorithm is based on the following concept. At an instant during the flight of a projectile, the projectile (regarded as a particle) is located at a point $P_0$ (118) and has a velocity $v_m$ (112) in an inertial reference frame N in which the projectile's target point $P_1$ (120) and the center E (122) of the (assumed spherically symmetric) Earth are fixed.

If the projectile's control surface were to cease functioning at the time instant $t_0$, there would exist a velocity $v_c$ such that, if the projectile had this velocity in N at the time instant $t_0$, it would strike at a specified time $t_r$ after moving in free fall in an elliptic trajectory C solely under the action of the Earth's gravitational field.

$V_d$ (116) is known as the deficit velocity of the projectile in N at time $t_0$. The velocity $v_g$ (114) that must be added to $v_m$ (112) to obtain $v_g$ (114) is called the velocity to be gained. The object of projected deficit guidance algorithm is to drive the projectile's velocity to be gained to zero as the flight progresses, so that at the instant the control surfaces are locked, the projectile velocity is equal to the deficit velocity. This ensures that the projectile strikes the target.

FIG. 8 illustrates the flow chart (160) of the method of updating in real time the estimated set of parameters of the trajectory of the non-thrusted flight vehicle of the present invention.

After storing the high rate navigational solution generated by the State Estimator (block 74 of FIG. 3) in the Parameter Estimator (block 78 of FIG. 3) (step 162 of FIG. 8), the parameters of the navigational solution are updated by the Parameter Estimator block at a slow rate cycle (step 164 of FIG. 8). The updated parameters are transferred (arrow 82 of FIG. 3) to the State Estimator (step 166 of FIG. 8) in order to update the coefficients of the Extended Kalman filter at the slow rate cycle.

The set of updated parameters generated by the Parameter Estimator block is also used at the slow rate to update the coefficients of an Internal Guidance and Control Module (IGCM) (68 of FIG. 3) in order to generate a set of trial parameters of a trial trajectory (step 168 of FIG. 8).

In one embodiment, the step of performing the Parameter Estimation algorithm further includes the steps of generating a set of trial parameters to generate a trial trajectory, comparing the trial trajectory with a trajectory provided by the State Estimator to generate a Cost Function, and using the Optimization algorithm to search for an optimum set of parameters that minimizes the Cost Function.

Using the set of trial parameters generated by the IGMC, the Parameter Estimator performs the Parameter Estimation algorithm in order to select as optimum trajectory of the non-thrusted flight vehicle (step 170 of FIG. 8). Referring back to flow chart (130 of FIG. 6), after the optimum trajectory is found, the internal guidance and control signal (99 of FIG. 3) is generated by the Internal Guidance and Control Processor (68 of FIG. 3). The internal guidance and control signal is used by the External Guidance and Control Processor (98) to generate an external guidance and control signal configured to perform a real time navigation of the non-thrusted flight vehicle (step 138 of FIG. 6).

In one embodiment, the step of generating the external guidance and control signal further includes the steps of continually predicting an impact point and generating a control command to the canards and/or fins of the non-thrusted flight vehicle by comparing the predicted impact point with the aimpoint.

In another embodiment, the step of generating the guidance and control signal further includes the step of continually calculating the delta velocity required to fly the non-thrusted flight vehicle to the aimpoint by applying correlated velocity algorithm to a correlated velocity, wherein the correlated velocity is generated by aerodynamic forces on control surfaces of the non-thrusted flight vehicle.

In one embodiment, the step of continually predicting an impact point is implemented by using the predictive proportional navigation (PPN) guidance algorithm. (See discussion above.)

Another aspect of the present invention is directed to an apparatus (80 of FIG. 3) for a satellite positioning system (SATPS)-based guidance of a non-thrusted flight vehicle.

In one embodiment, the apparatus (80 of FIG. 3) comprises a set of Extended Kalman Filter algorithms (94), a GPS 'vector' navigational receiver (60), a Parameter Estimator (78), and an External Guidance and Control Module (EGCM) (98).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of a satellite positioning system (SATPS)-based guidance of a non-thrusted flight vehicle; said method comprising the steps of:

(a) estimating a state or a navigation solution of said non-thrusted flight vehicle by solving a set of non-linear equations of said non-thrusted flight vehicle by using a set of Extended Kalman Filter algorithms;

(b) updating said state of said non-thrusted flight vehicle by making real time attitude measurements of the coordinates of said non-thrusted flight vehicle by using a SATPS 'vector' navigational receiver;

(c) estimating and updating parameters of predicted trajectory of said non-thrusted flight vehicle by using a Parameter Estimator; and (d) generating a guidance and control signal configured to perform a real time navigation of said non-thrusted flight vehicle by using an External Guidance and Control Module (EGCM).

2. The method for claim 1, wherein said step (a) of estimating said state of said non-thrusted flight vehicle further includes the step of:
   (a1) performing linearization of said set of non-linear equations of motion of said non-thrusted flight vehicle around a nominal trajectory and converting said set of non-linear equations of motion into a set of linearized equations of motion that is solvable by a Standard Kalman Filter method.

3. The method of claim 1, wherein said step (c) of estimating and updating parameters of predicted trajectory of said non-thrusted flight vehicle by using said Parameter Estimator further includes the step of:
   (c1) updating in real time an estimated set of external parameters and an estimated set of internal parameters of said non-thrusted flight vehicle in order to provide the in-flight corrections to initial conditions of said initially predicted trajectory of said non-thrusted flight vehicle, so that a corrected ballistic trajectory of said non-thrusted flight vehicle hits an aimpoint.

4. The method of claim 3, wherein said step of updating in real time said set of external parameters and said set of internal parameters of said non-thrusted flight vehicle further includes the step of:
   estimating said set of external parameters and said set of internal parameters by using a weighting least square fit operation.

5. The method of claim 1, wherein said step (d) of generating said guidance and control signal configured to perform said real time navigation of said non-thrusted flight vehicle further includes the steps of:
   (d1) predicting an impact point by using a predictive proportional navigation (PPN) guidance algorithm; and
   (d2) generating a control command to the canards and/or fins of said non-thrusted flight vehicle by comparing said predicted impact point with said aimpoint.

6. The method of claim 1, wherein said step (d) of generating said guidance and control signal configured to perform said real time navigation of said non-thrusted flight vehicle further includes the step of:
   (d3) calculating the delta velocity required to fly said non-thrusted flight vehicle to said aimpoint by applying correlated velocity algorithm to a correlated velocity, wherein said correlated velocity is generated by aerodynamic forces on control surfaces of said non-thrusted flight vehicle.

7. The method of claim 1, wherein said step (b) of updating said state of said non-thrusted flight vehicle by making real time attitude measurements of the coordinates of said non-thrusted flight vehicle by using said SATPS 'vector' navigational receiver/further includes the steps of:
   (b1) obtaining a set of (XYZ) data and a set of attitude data from said SATPS 'vector' receiver at a medium rate;
   (b2) using the Measurement Model to convert said (XYZ) data and said set of attitude data into the line of sight solution;
   (b3) performing the Reasonableness test to reject an unsuitable data;
   (b4) using a set of suitable data that passes the Reasonableness test to update said Kalman filter and to propagate said Kalman filter in order to obtain a high rate navigation solution;
   (b5) transferring said high rate navigational solution to said Parameter Estimator; and
   (b6) using said high rate navigational solution to provide the feedback signal to said Measurement Model.

8. The method of claim 3, wherein said step (c1) of updating in real time said estimated set of parameters of said trajectory of said non-thrusted flight vehicle further includes the steps of:
   (c1,1) storing said high rate navigational solution generated by said State Estimator in said Parameter Estimator block;
   (c1,2) updating the parameters of said navigational solution by said Parameter Estimator block at a slow rate cycle;
   (c1,3) transferring said updated parameters to the State Estimator in order to update the coefficients of said Extended Kalman filter at said slow rate cycle;
   (c1,4) updating the coefficients of an Internal Guidance and Control Module (IGCM) with said set of updated parameters generated by said Parameter Estimator block at said slow rate in order to generate a set of trial parameters of a trial trajectory; and
   (c1,5) using said set of trial parameters generated by said IGMC to perform the Parameter Estimation algorithm in order to select as optimum trajectory of said non-thrusted flight vehicle.

9. The method for claim 8, wherein said step (c1,5) of performing the Parameter Estimation algorithm further includes the steps of:
   generating a set of trial parameters to generate a trial trajectory;
   comparing said trial trajectory with a trajectory provided by the State Estimator to generate a Cost Function; and
   using the Optimization algorithm to search for an optimum set of parameters that minimizes said Cost Function.

10. A method of a satellite positioning system (GPS)-based guidance of a non-thrusted flight vehicle; said method comprising the steps of:
    (a) estimating a state or a navigation solution of said non-thrusted flight vehicle by solving a set of non-linear equations of said non-thrusted flight vehicle by using a set of Extended Kalman Filter algorithms;
    (b) updating said state of said non-thrusted flight vehicle by making real time attitude measurements of the coordinates of said non-thrusted flight vehicle by using a GPS 'vector' navigational receiver;
    (c) estimating and updating parameters of predicted trajectory of said non-thrusted flight vehicle by using a Parameter Estimator; and
    (d) generating a guidance and control signal configured to perform a real time navigation of said non-thrusted flight vehicle by using an External Guidance and Control Module (EGCM).

11. An apparatus for a satellite positioning system (SATPS)-based guidance of a non-thrusted flight vehicle comprising:
    (a) a set of Extended Kalman Filter algorithms configured to estimate a state or a navigation solution of said non-thrusted flight vehicle by solving a set of non-linear equations of motion of said non-thrusted flight vehicle;
    (b) a SATPS 'vector' navigational receiver configured to update said state of said non-thrusted flight vehicle by making real time attitude measurements of the coordinates of said non-thrusted flight vehicle;

(c) a Parameter Estimator configured to estimate and update parameters of predicted trajectory of said non-thrusted flight vehicle; and (d) an External Guidance and Control Module (EGCM) configured to generate a guidance and control signal to perform a real time navigation of said non-thrusted flight vehicle.

12. An apparatus for a satellite positioning system (GPS)-based guidance of a non-thrusted flight vehicle comprising:

(a) a set of Extended Kalman Filter algorithms configured to estimate a state or a navigation solution of said non-thrusted flight vehicle by solving a set of non-linear equations of motion of said non-thrusted flight vehicle;

(b) a GPS 'vector' navigational receiver configured to update said state of said non-thrusted flight vehicle by making real time attitude measurements of the coordinates of said non-thrusted flight vehicle;

(c) a Parameter Estimator configured to estimate and update parameters of predicted trajectory of said non-thrusted flight vehicle; and (d) an External Guidance and Control Module (EGCM) configured to generate a guidance and control signal to perform a real time navigation of said non-thrusted flight vehicle.

13. An apparatus for a satellite positioning system (SATPS)-based guidance of a non-thrusted flight vehicle comprising:

(a) a means for estimating a state or a navigation solution of said non-thrusted flight vehicle by solving a set of non-linear equations of motion of said non-thrusted flight vehicle;

(b) a means for updating said state of said non-thrusted flight vehicle by making real time attitude measurements of the coordinates of said non-thrusted flight vehicle;

(c) a means for estimating and updating parameters of predicted trajectory of said non-thrusted flight vehicle; and (d) a means for generating a guidance and control signal to perform a real time navigation of said non-thrusted flight vehicle.

* * * * *